United States Patent [19]
Portmann

[11] 3,998,498
[45] Dec. 21, 1976

[54] APPARATUS FOR GUIDING A RAM WITHIN THE MACHINE FRAME OF A PUNCH PRESS OR THE LIKE

[75] Inventor: August Thomas Portmann, Arbon, Switzerland

[73] Assignee: Bruderer AG, Arbon, Switzerland

[22] Filed: July 25, 1975

[21] Appl. No.: 599,261

[30] Foreign Application Priority Data

Aug. 29, 1974 Switzerland .................... 11780/74

[52] U.S. Cl. ................................ 308/3 A; 308/4 R
[51] Int. Cl.[2] ........................................ F16C 17/00
[58] Field of Search ........... 308/3 R, 3 A, 4 R, 6 R; 83/635, 637

[56] References Cited

UNITED STATES PATENTS

| | | | |
|---|---|---|---|
| 3,290,070 | 12/1966 | Jawiszewski ................... | 308/4 C X |
| 3,353,876 | 11/1967 | Moyer .............................. | 308/6 R |

*Primary Examiner*—Robert R. Song
*Assistant Examiner*—Gene A. Church
*Attorney, Agent, or Firm*—Ladas, Parry, Von Gehr, Goldsmith & Deschamps

[57] ABSTRACT

An apparatus for guiding a ram in the machine frame of a punch press or stamping machine or the like comprising four guides at least approximately arranged in the corners of a rectangle, each guide comprising a guide column. Each guide column possesses two guide surfaces arranged in the plane of travel of the workpiece, such as a strip of stock, to be punched. The two guide surfaces are situated opposite to one another with respect to a diagonal direction of the rectangle defined by the guides and cooperate with guide bodies arranged at the ram or the machine frame.

20 Claims, 7 Drawing Figures

Fig. 1
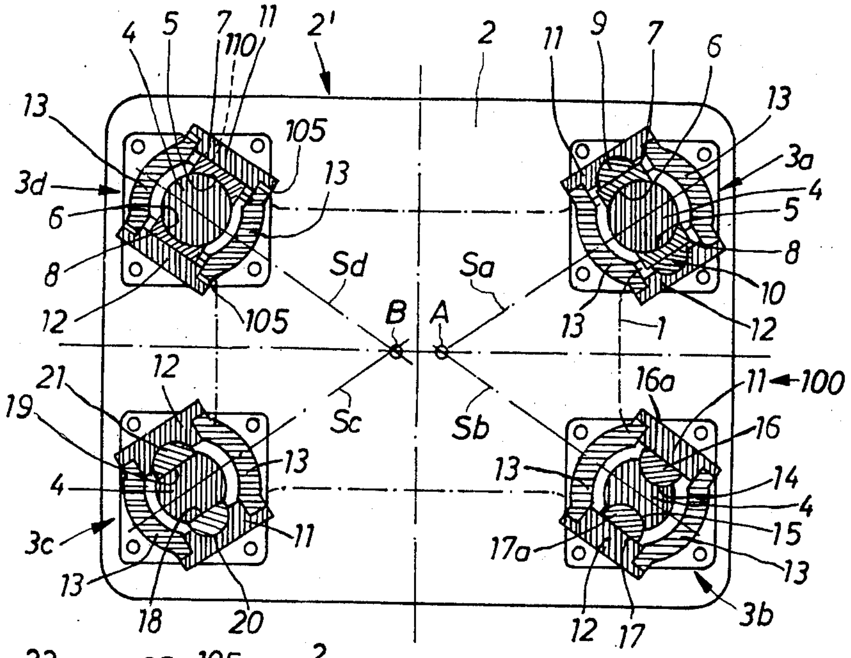
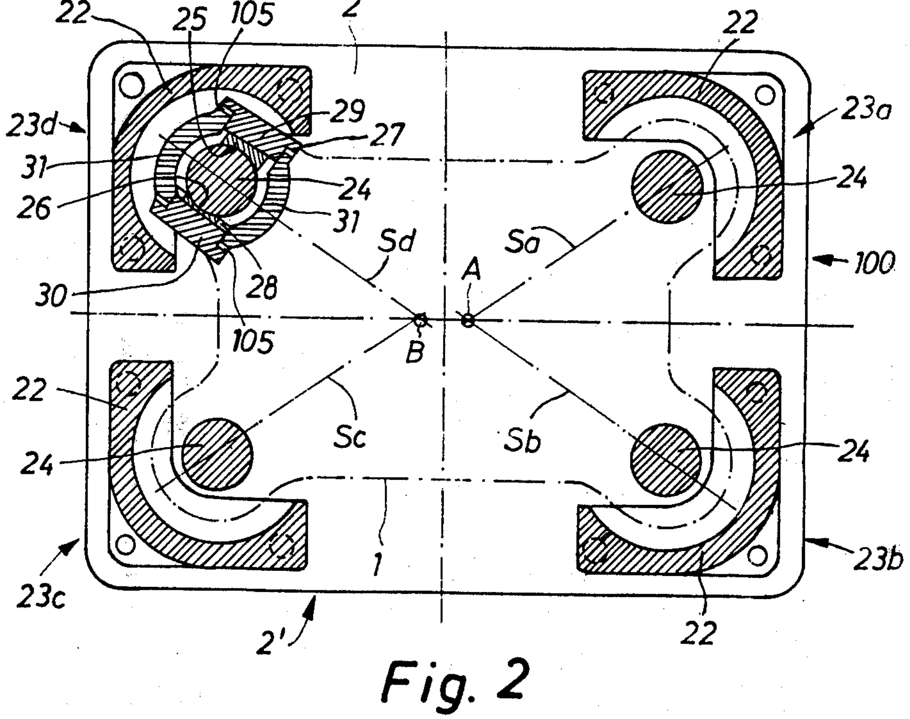
Fig. 2

APPARATUS FOR GUIDING A RAM WITHIN THE MACHINE FRAME OF A PUNCH PRESS OR THE LIKE

BACKGROUND OF THE INVENTION

The present invention relates to a new and improved apparatus for guiding a ram in the machine frame of a punch press or stamping press or the like —hereinafter generally referred to as a punch press—, said apparatus being of the type comprising four guides arranged at least approximately in the corners of a rectangle, each guide possessing a guide column.

Modern punch presses or stamping machines operate with a high number of strokes, and thus due to the increased frictional losses causes an increase in the temperature of the punch press or the like. Moreover, for such type punch presses there are needed larger clamping surfaces or mounting tables for the tools, requiring large spacing between the guide columns of the ram. Both of the aforementioned factors render more difficult or impossible the desired accurate guiding of the ram during all operating conditions.

In order to permit free expansion of the ram during fluctuations in temperature, there have already been proposed to the art apparatus of the previously mentioned type wherein the ram is guided along a diagonally extending guide surface at each guide column. In the presence of lateral pressure in the lengthwise direction or the transverse direction of the ram, as such occurs during eccentric loading of the ram, only two out of the total of four guide locations or guides are loaded, which, owing to the unavoidable elastic deformations occurring at both of the non-loaded guides, produces play and thus inaccurate positioning of the ram.

SUMMARY OF THE INVENTION

Hence, it is a primary object of the present invention to provide an improved apparatus of the previously mentioned type incorporating structure for guiding the ram in the machine frame of a punch press or the like in a manner not associated with the aforementioned drawbacks or limitations of the prior art constructions.

Another and more specific object of the present invention aims at the provision of apparatus of the previously mentioned type rendering possible an extremely accurate guiding of the ram, even during eccentric loading of such ram.

Now in order to implement these and still further objects of the invention, which will become more readily apparent as the description proceeds, the apparatus of this development is manifested by the features that each guide column possesses two guide surfaces arranged at least in the direction of travel of the workpiece, typically for instance a band or strip to be processed at the punch press, these guide surfaces being located opposite one another with respect to a diagonal direction of the rectangle formed by the guides. Furthermore the guide surfaces cooperate with guide bodies arranged at the ram or at the machine frame.

Each of the four guide columns accordingly possesses two guide locations, so that even during eccentric loading of the ram at least one such guide location of each guide column is loaded, increasing the accuracy of the ram guiding action.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a plan view, partially in section, of a first exemplary embodiment of a punch ram guided in a machine frame of a punch press or the like;

FIG. 2 is a plan view, partially in section, of a second exemplary embodiment of a punch ram guided in a machine frame of a punch press or the like;

FIG. 3 schematically illustrates a longitudinal sectional view through the longitudinal central plane of a first embodiment of a punch press or the like;

FIG. 4 schematically illustrates a longitudinal sectional view through the longitudinal central plane of a second exemplary embodiment of a punch press or the like;

FIG. 5 schematically illustrates a longitudinal sectional view through the lengthwise central plane of a third exemplary embodiment of punch press or the like;

FIG. 7 is a view, analogous to the showing of FIG. 6, schematically depicting a fourth embodiment of a punch press or the like.

DETAILED DESCRIPTION OF THE PREFERRED EMBODIMENTS

Figure 3:
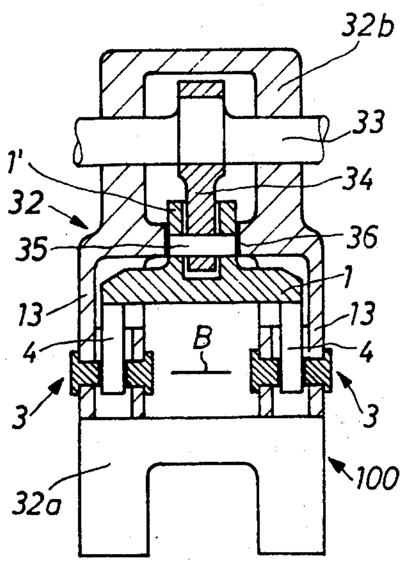

Describing now the drawings, in the showing of FIG. 1 there is illustrated in plan view an exemplary embodiment of a punch ram guide arrangement of a punch press or the like, wherein the guide columns 4 are secured at the broken or phantom line illustrated punch ram 1 of a punch press or stamping machine 100, which as mentioned before will be hereinafter simply referred to as a punch press. The lower portion or understructure of the machine frame 2' is designated by reference character 2. The four guides **3*a*, 3*b*, 3*c* and 3*d* have been shown in sectional view and are arranged either exactly or approximately at the corners of a guadrilateral, typically a rectangle defined thereby. In certain instances the guides 3*a*, 3*b*, 3*c*, and 3*d*** could also be arranged approximately at the corners of a square, and hence, this arrangement also should be conceptually imagined.

For each of the four guides **3*a*, 3*b*, 3*c*, and 3*d*** there is illustrated a different possible construction, but however in practical embodiments of the invention all four guides typically possess the same construction.

As already mentioned, the guide columns 4 of each guide are conveniently secured in conventional manner to the undersides of the ram 1.

In the case of the guide **3*a* the guide column 4 is of substantially cylindrical construction and possesses two guide surfaces 5 and 6** which are situated opposite to one another with respect to an axis of symmetry *Sa*. This symmetry axis *Sa* extends approximately parallel to a diagonal of the quadrilateral, here assumed to be a rectangle defined by the guides **3*a*, 3*b*, 3*c*, and 3*d***.

These guide surfaces 5 and 6 coact with stationary guide bodies 7 and 8, respectively, formed as sliding elements which are arranged in the plane of travel B of the workpiece, typically in the form of a band or sheet. The guide bodies 7 and 8 are each supported at a support body 9 and 10, respectively, possessing a substantially semi-circular cross-sectional configuration. Each support body or support body member 9 and 10 is mounted in a holder or holding element 11 and 12, respectively, which is connected with a hollow substantially cylindrical support column 13. This support column or support column member 13 connects the lower portion 2 of the machine frame or machine frame member 2' with the here not particularly illustrated upper portion thereof, as will be discussed in greater detail in connection, for instance with the embodiment of punch press shown in FIG. 3.

The holder elements 11 and 12 are advantageously connected by means of a suitable screw or thread connection or equivalent structure with the support column 13. In the case of the guide 3*b* the guide column 4 possesses two recesses 14 and 15 in which there are arranged the sliding elements or blocks 16 and 17 possessing a substantially semi-circular cross-sectional configuration and which are fixedly connected with the guide column 4. These slide or sliding elements 16 and 17 possess guide surfaces 16*a* and 17*a*, respectively, which cooperate with the holder elements 11 and 12, respectively, constructed as guide bodies. Analogous to the guide 3*a* the holder elements 11 and 12 are detachably connected with the support column 13.

The slide or sliding elements 16 and 17 are arranged in such a manner that the guide surfaces 16*a* and 17*a* are situated opposite to one another with respect to a symmetry axis S*b* which extends approximately parallel to a diagonal of the rectangle or rectangular configuration formed by the guides 3*a*, 3*b*, 3*c*, and 3*d*. Both of the symmetry axes S*a* and S*b* intersect at a point A.

In the case of the guide 3*c* the substantially cylindrical guide column 4 possesses two flat guide surfaces 18 and 19 which are situated opposite to one another with respect to a symmetry axis S*c*. This symmetry axis S*c* extends approximately parallel to a diagonal of the rectangle, analogous to the symmetry axes S*a* and S*b*.

The guide surfaces 18 and 19 cooperate with stationary guide bodies 20 and 21 constructed as sliding elements, these guide bodies 20 and 21 possessing a substantially semi-circular shape cross-sectional configuration and are conveniently held in the holder elements 11 and 12. These holder elements 11 and 12 are detachably connected with the support column 13 analogous to the guides 3*a* and 3*b* discussed above.

The guide 3*d* is constructed analogous to the guide 3*a*. The substantially cylindrical guide column 4 likewise possesses two guide surfaces 5 and 6 which are located opposite one another with respect to an axis of symmetry S*d* extending approximately parallel to a diagonal of the aforementioned rectangle. The guide surfaces 5 and 6 cooperate with stationary guide elements 7 and 8 constructed as sliding elements or blocks, and these guide elements 7 and 8, in contrast to the guide 3*a*, are directly connected with the holder elements 11 and 12. These holder elements 11 and 12, as already mentioned heretofore, are detachably connected with the support column 13.

The axes of symmetry S*c* and S*d* intersect at a point B. In the event that the symmetry axes S*a*, S*b*, S*c*, and S*d* coincide with the diagonals of the rectangle defined by the guides 3*a*, 3*b*, 3*c*, and 3*d*, then the points of intersection A and B likewise coincide, something which is also desired. Still the existence of other conditions, for instance space considerations, might make it necessary to provide a spacing between the points A and B as illustrated. The size of such spacing must, however, be selected to be as small as possible so that there is nonthless guaranteed that an exact guiding of the press ram or ram member 1 will be maintained.

Continuing, in FIG. 2 there is illustrated, analogous to the showing of FIG. 1, an exemplary embodiment or press ram guide arrangement, wherein the guide columns 24 are arranged in the machine frame member 2'. The four guides 23*a*, 23*b*, 23*c*, and 23*d* are arranged either exactly or approximately in the corners of a quadrilateral, typically a rectangle or a square. As a matter of convenience in the representation of the drawing of FIG. 2, there is only illustrated in detail the guide 23*d* which corresponds to the guide 3*d* of the arrangement of FIG. 1.

The guide columns 24 are held at one end at the lower portion or understructure 2 of the machine frame member 2' and at the other end in the here not particularly illustrated upper portion of such machine frame. Arranged about the guides 23*a*, 23*b*, 23*c*, and 23*d* are the supports or support members 22 which connect the lower portion 2 with the upper portion of the machine frame member 2'. If the four guide columns 24 are constructed so as to be dimensioned sturdy enough so that they can assume the connection of the upper portion and lower portion of the machine frame member with one another, then, there can be dispensed with the use of the supports or support members 22.

The guide column 24 of the guide 23*d* is of substantially cylindrical construction and possesses two guide surfaces 25 and 26 which are situated opposite one another with respect to a symmetry axis S*d* which corresponds to the symmetry axis S*d* of the arrangement of FIG. 1. The guide surfaces 25 and 26 cooperate with guide bodies or guide body members 27 and 28 which are constructed as sliding elements or blocks. These guide bodies 27 and 28 are secured at the holder elements 29 and 30, respectively, which are detachably or releasably connected with a hollow substantially cylindrical support or carrier column 31. This support column 31 is secured to the ram member or ram 1.

The guides 23*a*, 23*b*, and 23*c* can be constructed analogous to the guide 23*d* corresponding to one of the guides 3*a*, 3*b*, 3*c*, and 3*d* of the arrangement of FIG. 1, wherein the guide column 24 is stationary and the remaining components of the guide move together with the ram member 1.

In order to be able to adjust the play in the guides between the moved and stationary components of the guides, the spacing between the holder elements 11 and 12 and 29 and 30 of the guides 3*a*, 3*b*, 3*c*, and 3*d* and 23*a*, 23*b*, 23*c*, and 23*d*, of the respective arrangements of FIGS. 1 and 2, is variable. This can be, for instance, realized in that intermediate layers or equivalent intermediate members, for instance foils, as generally indicated by reference character 105, are inserted or otherwise embedded between the holder elements 11 and 12 and the support column 13 and the holder elements 29 and 30 and the support column 31, respectively. This adjustment of the play also can be realized by means of a threaded adjustment device which can be externally actuated, for instance conceptually considering the means 105 as threading by way of example. In the guide bodies 7, 8, 11, 12, 20, 21, 27 and 28 there are provided oil infeed or supply bores through which there can be delivered a lubricating oil. To simplify the drawing illustration, a typical oil infeed or supply bore has been indicated by reference character 110 in FIG. 1 for element 11, but the other components mentioned above are equally provided with such bore or equivalent structure.

On the basis of the exemplary embodiments of press punch 100 schematically illustrated in FIGS. 3 to 7 there is clearly portrayed the arrangement of the guides illustrated in FIGS. 1 and 2 for the ram member or ram 1.

The press punch 100 illustrated in FIG. 3 possesses a machine frame or machine frame member 32 having a lower portion 32*a* and an upper portion 32*b*. The lower portion 32*a* and the upper portion 32*b* are connected with one another by means of the support columns 13 illustrated in FIG. 1. At the region of the workpiece travel plane B there are arranged the guides 3, as such have been illustrated in detail in FIG. 1.

At the underside of the press ram or ram member or ram 1 there are secured the guide columns 4. The ram member 1 is driven at one point by means of a revolving crankshaft 33 through the agency of a connecting rod 54, crankshaft 33 being guided in the machine frame member 32. The connecting rod 34 is connected by means of a shaft 35 with the upper portion 1′ of the ram member 1. This upper portion 1′ of the ram member 1 is guided in a central guide 36 in the machine frame member 32. This guide 36 is provided in addition to the guides 3 in the plane of travel of the band or strip stock or other workpiece.

Figure 4:
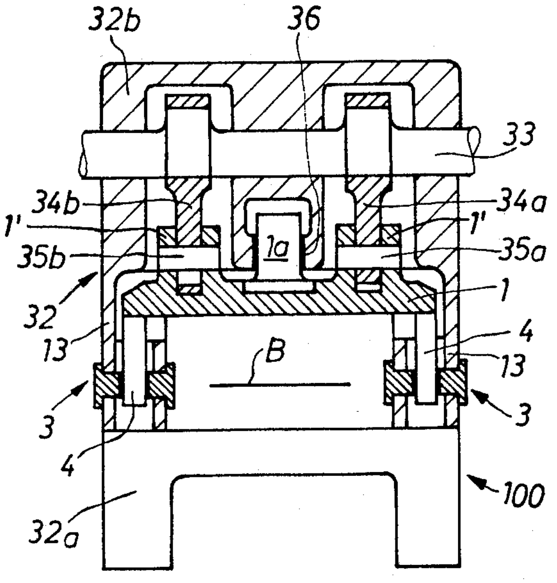

The press punch 100 shown in FIG. 4 extensively corresponds to the press punch shown in FIG. 3, so that as a matter of convenience for both FIGS. 3 and 4 the same components have been generally designated with the same reference characters. However, in this case the press ram or ram member 1 is driven at two points by means of two connecting rods 34*a* and 34*b* which are connected with the crankshaft 33. The connecting rods 34*a* and 34*b* are connected via the shafts 35*a* and 35*b*, respectively, with the ram member 1. In the machine frame member 32 there is likewise provided a central guide 36 in which there is additionally guided the ram member 1 by means of a pin or plug member 1*a*.

Figure 5:
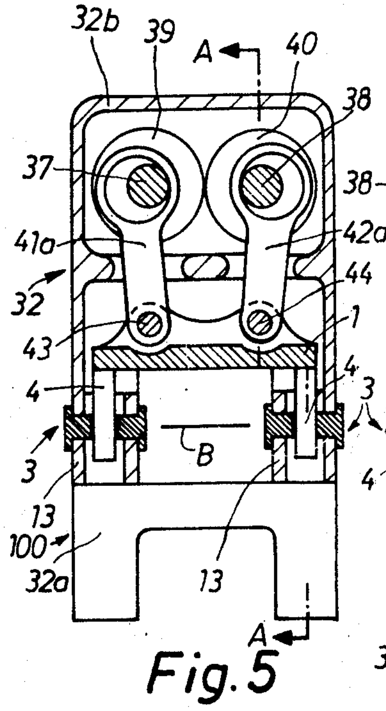
Figure 6:
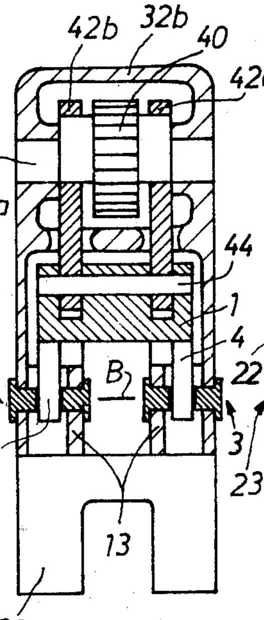
FIG. 6 is a cross-sectional view through the punch press depicted in FIG. 5, taken substantially along the line A—A thereof.
Figure 7:
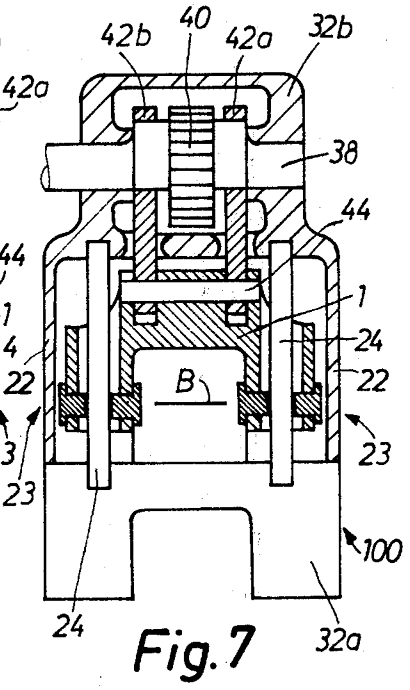

In the arrangement shown in FIGS. 5 and 6 there is depicted a press punch 100 wherein the ram member or ram 1 is driven at four points, the guiding of the ram member in the strip travel plane B is the same as for the exemplary embodiments of FIGS. 3 and 4.

There are provided two crankshafts 37 and 38 which are driven in conventional and therefore not further illustrated manner via the gears 39 and 40. Each crankshaft 37 and 38 drives two connecting rods 41*a*, 41*b*, and 42, 42*b*, respectively, which are connected by means of a shaft 43 and 44, respectively, with the ram 1.

By virture of this drive at four points there is insured for an essentially parallel position of the ram member 1 with respect to the machine lower portion 32*a* independent of the point of attack or application of an eccentric load, so that in contrast to the arrangement of FIGS. 3 and 4, apart from the guides 3, there are not necessary any additional ram guides in the strip travel plane B.

Of course, the respective press punch 100 as illustrated in FIGS. 3 to 6 inclusive instead of the guides 3 of the type according to the showing of FIG. 1, also could possess guides 23 according to the showing of FIG. 2. Such guiding of the ram member has been illustrated for the punch press 100 shown in FIG. 7 which otherwise corresponds to the punch press of FIGS. 5 and 6. The guide columns 24 of the guides 23, as already described in detail above with respect to the arrangement of FIG. 2, are fixedly anchored at the lower portion 32*a* and at the upper portion 32*b* of the machine frame or machine frame member 32 and are surrounded by the supports 22. The movable portion of the guides 23 is secured to the ram or ram member 1. In this case the drive of the ram member 1 occurs in the same manner as already described in conjunction with the embodiment of FIGS. 5 and 6 and therefore need not be further explained.

It is also possible to arrange the ram guides 3 and 23, respectively, apart from in the plane of travel of the strip stock, additionally also above or below such plane of travel of such strip stock in order to guide the ram member in the same manner at a still further or second location.

Apart from the drive arrangements discussed above, it is to be expressly understood that still other drive arrangements or drive techniques for the ram member are conceivable and will readily suggest themselves to those skilled in the art.

While there is shown and described present preferred embodiments of the invention, it is to be distinctly understood that the invention is not limited thereto, but may be otherwise variously embodied and practiced within the scope of the following claims.

What is claimed is:

1. An apparatus for guiding a ram member in a machine frame member of a punch press, comprising four guides arranged in spaced relationship from one another in a substantially quadrilateral configuration, each of said guides being at least approximately arranged at a region of a corner of the quadrilateral configuration, a guide column provided for each guide, each guide column being provided with two guide surfaces arranged in a plane of travel of the workpiece to be processed by the punch press, said two guide surfaces of each guide column being situated opposite one another with respect to a diagonal direction of the quadrilateral defined by the guides, guide bodies which cooperate with said guide surfaces, said guide bodies being arranged either at the ram member or at the machine frame member.

2. The apparatus as defined in claim 1, wherein said guide bodies are arranged at the punch member.

3. The apparatus as defined in claim 1, wherein said guide bodies are arranged at the machine frame member.

4. The apparatus as defined in claim 1, wherein said four guides are arranged in a substantially rectangular configuration.

5. The apparatus as defined in claim 1, wherein said four guides are arranged in a substantially square configuration.

6. The apparatus as defined in claim 1, further including means for adjusting the spacing between oppositely situated guide bodies.

7. The apparatus as defined in claim 6, wherein said adjustment means includes a threaded adjustment device for adjusting the spacing between the oppositely situated guide bodies.

8. The apparatus as defined in claim 1, wherein said guide columns are secured to the ram member and the guide bodies are stationarily mounted at the machine frame member.

9. The apparatus as defined in claim 1, wherein the guide columns are stationarily mounted in the machine frame member and the guide bodies are arranged at the ram member.

10. The apparatus as defined in claim 1, wherein said guide columns possess a substantially cylindrical configuration.

11. The apparatus as defined in claim 10, wherein the guide surfaces of each guide column are formed by sections of the outer surface of the substantially cylindrical guide columns.

12. The apparatus as defined in claim 10, wherein the guide surfaces are substantially flat.

13. The apparatus as defined in claim 1, wherein said guide bodies are supported by means of support elements of spherical configuration.

14. The apparatus as defined in claim 1, wherein said guide bodies are constructed as sliding elements.

15. The apparatus as defined in claim 14, further including a respective holder element at which there is secured each guide body, a support column arranged at the machine frame member, each holder element being detachably connected with said support column.

16. The apparatus as defined in claim 15, further including a support body for connecting each guide body with the holder element.

17. The apparatus as defined in claim 14, further including a respective holder element at which there is secured each guide body, a support column mounted at the ram member, each holder element being detachably connected with the support column mounted at the ram member.

18. The apparatus as defined in claim 17, further including a support body for connecting each guide body with the holder element.

19. The apparatus as defined in claim 1, further including sliding elements secured to the guide columns, said sliding elements possessing said guide surfaces.

20. The apparatus as defined in claim 1, wherein said guide bodies possess means defining lubricant infeed bores.

* * * * *